US008177975B2

(12) United States Patent
Schipper

(10) Patent No.: US 8,177,975 B2
(45) Date of Patent: May 15, 2012

(54) APPARATUS FOR REMOVING AIR AND/OR DEBRIS FROM A FLOW OF LIQUID

(75) Inventor: Aaron Schipper, Peru, IN (US)

(73) Assignee: Thrush Co., Inc, Peru, IN (US)

( * ) Notice: Subject to any disclaimer, the term of this patent is extended or adjusted under 35 U.S.C. 154(b) by 1230 days.

(21) Appl. No.: 10/762,095

(22) Filed: Jan. 21, 2004

(65) Prior Publication Data

US 2005/0155925 A1 Jul. 21, 2005

(51) Int. Cl.

*B01D 29/00* (2006.01)
*B01D 19/00* (2006.01)
*B01D 35/28* (2006.01)
*B01D 35/00* (2006.01)

(52) U.S. Cl. ..................... 210/323.2; 210/435; 210/436; 210/472; 210/180; 210/332; 210/346; 95/260; 95/262; 96/155; 96/176; 96/178; 96/179; 96/186; 96/219

(58) Field of Classification Search ............... 210/323.2, 210/435, 436, 472, 180, 332, 346; 95/260, 95/262; 96/155, 176, 178, 179, 186, 219
See application file for complete search history.

(56) References Cited

U.S. PATENT DOCUMENTS

| | | | | |
|---|---|---|---|---|
| 2,925,913 | A * | 2/1960 | Wheeler, Jr. | 210/323.2 |
| 3,668,822 | A * | 6/1972 | Mannion et al. | 96/219 |
| 3,854,906 | A | 12/1974 | Roffelsen | |
| 4,027,691 | A | 6/1977 | Roffelsen | |
| 4,051,033 | A * | 9/1977 | Blace | 210/193 |
| 4,358,299 | A | 11/1982 | Jensen et al. | |
| 4,381,928 | A | 5/1983 | Roffelsen | |
| 4,427,421 | A | 1/1984 | Jensen et al. | |
| 4,443,346 | A * | 4/1984 | Muller | 210/785 |
| 4,456,172 | A | 6/1984 | Roffelsen | |
| 4,645,518 | A | 2/1987 | Roffelsen | |
| 4,718,922 | A | 1/1988 | Roffelsen | |
| 4,985,182 | A * | 1/1991 | Basse et al. | 261/94 |
| 5,443,724 | A * | 8/1995 | Williamson et al. | 210/323.2 |
| 5,490,874 | A * | 2/1996 | Kuster et al. | 96/204 |
| 5,500,132 | A * | 3/1996 | Elmi | 210/708 |
| 5,601,635 | A | 2/1997 | Roffelsen | |
| 5,676,740 | A * | 10/1997 | Schwartz et al. | 96/204 |
| 5,693,383 | A | 12/1997 | Basse et al. | |
| 5,772,870 | A | 6/1998 | Basse | |
| 5,882,510 | A | 3/1999 | Basse et al. | |
| 6,893,485 | B2 * | 5/2005 | MacDuff | 96/219 |

OTHER PUBLICATIONS

Brochure entitled “American Air Purgers”, by Amtrol.

* cited by examiner

*Primary Examiner* — Benjamin Kurtz
(74) *Attorney, Agent, or Firm* — Faegre Baker Daniels

(57) ABSTRACT

An apparatus removes air or debris from a flow of liquid. The apparatus includes a shell having an inlet, an outlet, and an elongate inner cavity in fluid communication with each of the inlet and the outlet. A plurality of elongate coalescing medium assemblies are disposed within the cavity of the shell such that the coalescing medium assemblies are oriented substantially parallel to each other. Each coalescing medium assembly includes a plurality of wire mesh tubes oriented substantially parallel to each other. A wire mesh retaining wall substantially surrounds the tubes and holds the tubes together.

42 Claims, 8 Drawing Sheets

10
26
36
22
24
86
28
47
32
34
40
20
42
30
18
44
46
12
14
16
38

APPARATUS FOR REMOVING AIR AND/OR DEBRIS FROM A FLOW OF LIQUID

BACKGROUND OF THE INVENTION

1. Field of the Invention

The present invention relates to an apparatus for removing air and/or debris from a flow of liquid, and, more particularly, to an apparatus including a coalescing medium for removing air and/or debris from a flow of water.

2. Description of the Related Art

It is known to use a filter to remove air and/or dirt from a flow of water. Such flows of water are commonly used in conjunction with pressure booster systems, heat exchangers, pumps, and water heaters, for example. Dirt or debris is caught or removed from the flow by the filter, and the dirt then falls to the bottom of the filter's housing. Small air bubbles form on the filter and then coalesce into larger bubbles that float to the top of the filter's housing. Previously known coalescing media/filters include a solid cylindrical copper core disposed concentrically within a cylindrical metal wire mesh. The mesh includes a continuous, substantially horizontal metal wire that is spiraled around the core and supported by substantially vertical wire segments that are evenly spaced in the horizontal direction. An array of copper wires extends radially from an outer surface of the core to thereby interconnect the core and the mesh. The opposite ends of each copper wire are respectively attached to the core and to the mesh such as by soldering.

A problem is that these prior art coalescing medium/filters are difficult to manufacture. The steps of forming the metal wire spiral, soldering the vertical wire segments to the metal wire spiral to form a wire mesh, and soldering the copper wires to the solid cylindrical copper core and to the wire mesh are all labor intensive, time consuming, and costly. Another problem is that, although copper is relatively easy to solder, copper corrodes in a flow of water and is structurally weak. Thus, copper is not extremely durable for water filtering applications, and filters that include copper may need to be periodically replaced. Another disadvantage of copper is that it is a relatively expensive metal.

What is needed in the art is an apparatus for removing air or debris from a flow of liquid wherein the apparatus includes a coalescing medium that can be easily and inexpensively manufactured. What is further needed in the art is an apparatus for removing air or debris from a flow of liquid wherein the apparatus is durable and does not need to be frequently replaced.

SUMMARY OF THE INVENTION

The present invention provides an apparatus for removing air or debris from a flow of water wherein the apparatus includes a coalescing medium assembly formed of tubes that are easily rolled from a stainless steel wire mesh. The wire mesh tubes are arranged around a central solid cylindrical tube, and the wire mesh tubes are held against the solid cylindrical tube by a stainless steel wire mesh retaining wall that is wrapped around the tubes. Thus, the present invention provides an air/dirt removing apparatus that is easily and inexpensively manufactured and that can be formed of highly durable stainless steel.

The present invention provides a coalescing medium assembly that can be easily, quickly and inexpensively manufactured by rolling pieces of wire mesh into tubular or tube-like shapes, and arranging the "tubes" such that liquid flows through the tubes in a direction substantially perpendicular to the lengths of the tubes. The tubes can be placed in the cylindrical cavity of a shell that is in fluid communication with liquid-carrying conduits. A cylindrical tube having a substantially continuous side surface can be centrally positioned among the wire mesh tubes. The central tubes can functionally complement the wire mesh tubes in that the substantially continuous side surface of the central tube can primarily promote the coalescing of air bubbles, while the wire mesh tubes can primarily catch, trap or otherwise remove dirt particles from the flow of liquid. The wire mesh tube can also provide some additional surface area for coalescing. With or without a central tube, the wire mesh tubes can be easily held together by a wire mesh retaining wall that can perform the same filtering and coalescing functions as the wire mesh tubes themselves.

The invention comprises, in one form thereof, an apparatus removes air or debris from a flow of liquid. The apparatus includes a shell having an inlet, an outlet, and an elongate inner cavity in fluid communication with each of the inlet and the outlet. A plurality of elongate coalescing medium assemblies are disposed within the cavity of the shell such that the coalescing medium assemblies are oriented substantially parallel to each other. Each coalescing medium assembly includes a plurality of wire mesh tubes oriented substantially parallel to each other. A wire mesh retaining wall substantially surrounds the tubes and holds the tubes together.

The invention comprises, in another form thereof, a coalescing medium assembly for removing air or debris from a flow of liquid. The coalescing medium assembly includes a plurality of wire mesh tubes oriented substantially parallel to each other. A wire mesh retaining wall substantially surrounds the tubes and holds the tubes together.

The invention comprises, in yet another form thereof, a coalescing medium assembly for removing air or debris from a flow of liquid. The coalescing medium assembly includes an elongate core element having a longitudinal axis extending in a longitudinal direction. The elongate core element also has at least one substantially continuous side surface facing in a lateral direction substantially perpendicular to the longitudinal direction. Wire mesh tubes surround the core element and are oriented substantially parallel to the core element.

An advantage of the present invention is that a planar wire mesh can be easily cut into sections that are easily rolled into tubes. A larger section of the planar wire mesh can be easily wrapped around the wire mesh tubes to thereby retain the tubes against a central solid cylindrical tube. Thus, the apparatus of the present invention can be quickly, easily and inexpensively manufactured.

Another advantage is that the resulting wire mesh tubes can be easily handled, assembled together and/or inserted into a shell cavity.

Yet another advantage is that the wire mesh can be formed of inexpensive and durable stainless steel. Thus, the coalescing medium formed of the wire mesh does not need to be frequently replaced.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
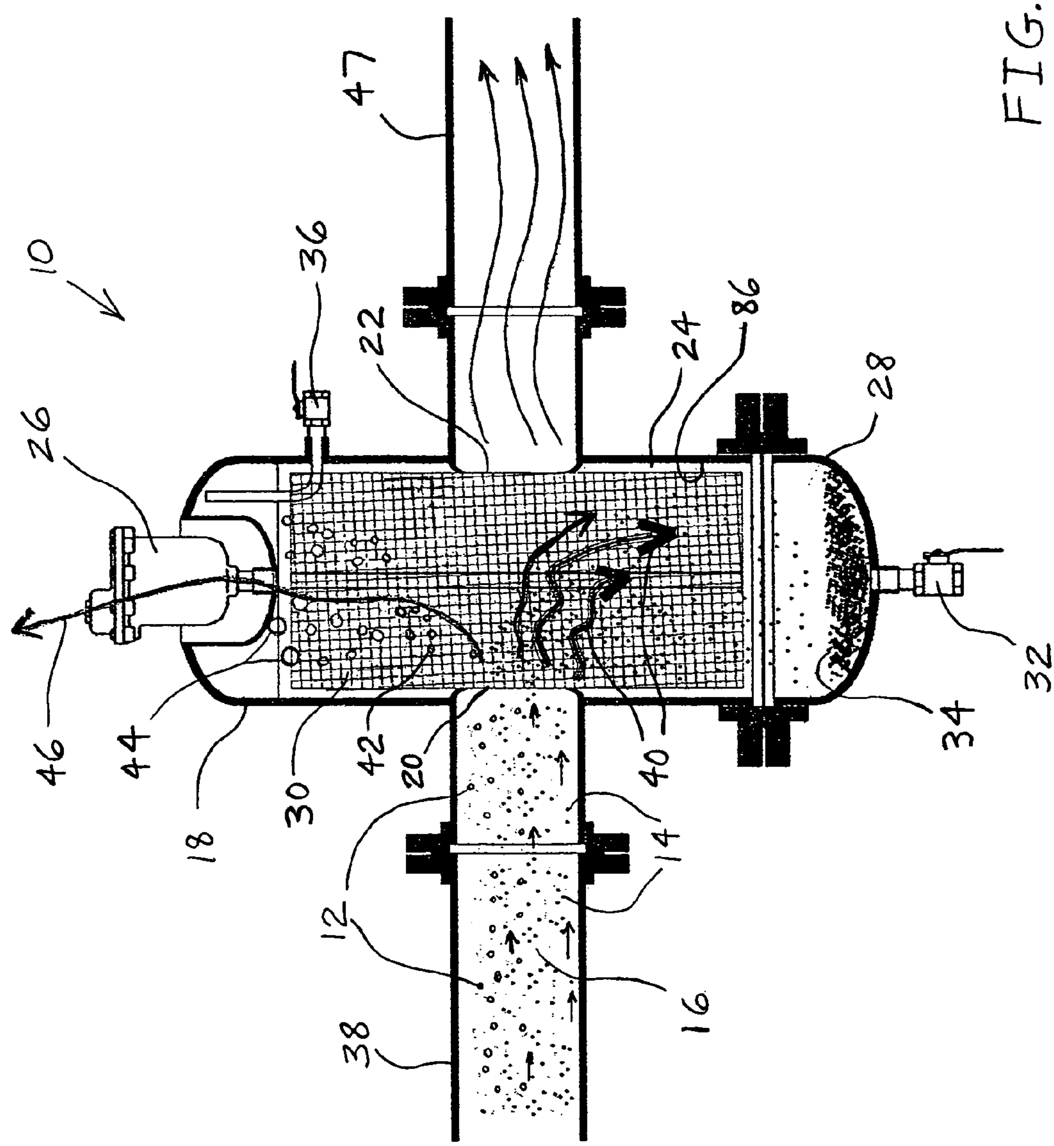
FIG. 1 is a schematic cross-sectional front view of one embodiment of an apparatus of the present invention for removing air or debris from a flow of liquid.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

Referring now to the drawings, and particularly to FIG. 1, there is shown one embodiment of an apparatus 10 of the present invention for removing entrained air and air microbubbles 12 and/or particles of dirt or debris 14 from a flow of liquid, such as a flow of water 16. Apparatus 10 includes a shell 18 having an inlet 20 devoid of flow restrictions, an outlet 22 devoid of flow restrictions, and an elongate inner cavity 24 in fluid communication with each of inlet 20 and outlet 22. Shell 18 also includes a one-way venting device 26 for releasing air bubbles from cavity 24, and a removable bottom section 28. Bottom section 28 can be separated from the remainder of shell 18 in order to insert a coalescing medium assembly 30 into cavity 24, or to remove assembly 30 therefrom, such as for cleaning. Coalescing medium assembly 30 is indicated only schematically in FIG. 1, as the structural details of assembly 30 will be discussed in detail below. Bottom section 28 includes a valve 32 through which settled dirt particles 34 can be selectively drained or otherwise removed from bottom section 28. Shell 18 also includes a valve 36 through which the pressure at the top of cavity 24 can be selectively equalized with ambient air pressure.

In operation, a flow of water 16 including entrained air and air microbubbles 12 and dirt particles 14 passes through inlet 20 via a conduit 38. The speed of the flow is reduced in cavity 24 by virtue of the larger cross-sectional area of cavity 24 in comparison with that of conduit 38. Dirt particles 14 may impinge upon coalescing medium assembly 30, which can cause particles 14 to fall into bottom section 28, as indicated by arrows 40. Thus, coalescing medium assembly 30 strains or filters dirt particles 14 from the flow of water 16. Entrained air is pulled out of solution in cavity 24 and forms microbubbles 42 that cling to coalescing medium assembly 30. Microbubbles 42 and other microbubbles 12 from water flow 16 collect and coalesce on coalescing medium assembly 30 to form larger air bubbles 44. Larger bubbles 44 can quickly rise to the top of cavity 24 and pass through venting device 26 to ambient air, as indicated by arrow 46. The flow of water 16, having had air and/or debris at least partially removed therefrom, exits cavity 24 via outlet 22 and conduit 47.

Figure 2:
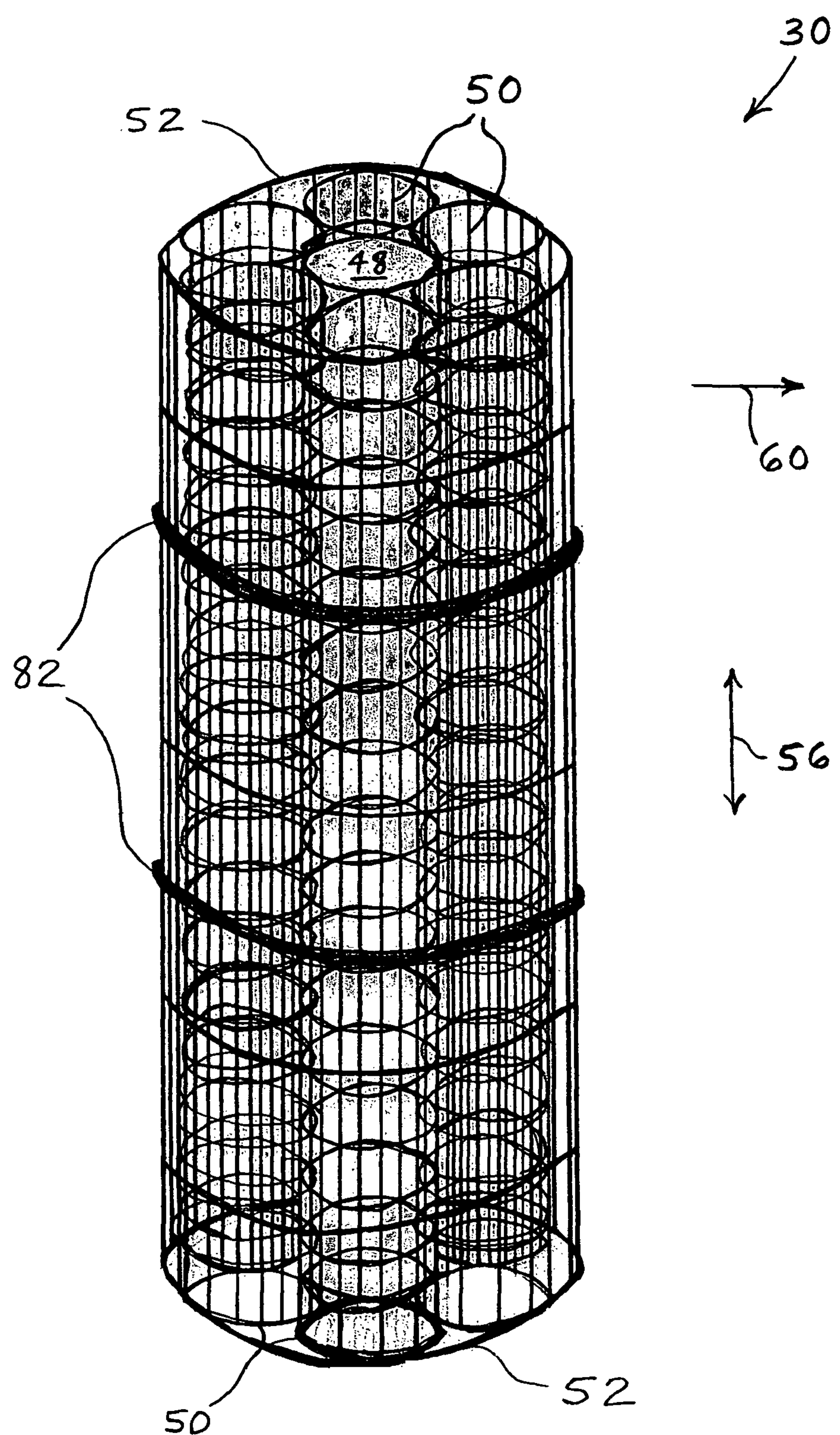
FIG. 2 is a perspective view of one embodiment of a coalescing medium assembly of the apparatus of FIG. 1.
Figure 3:
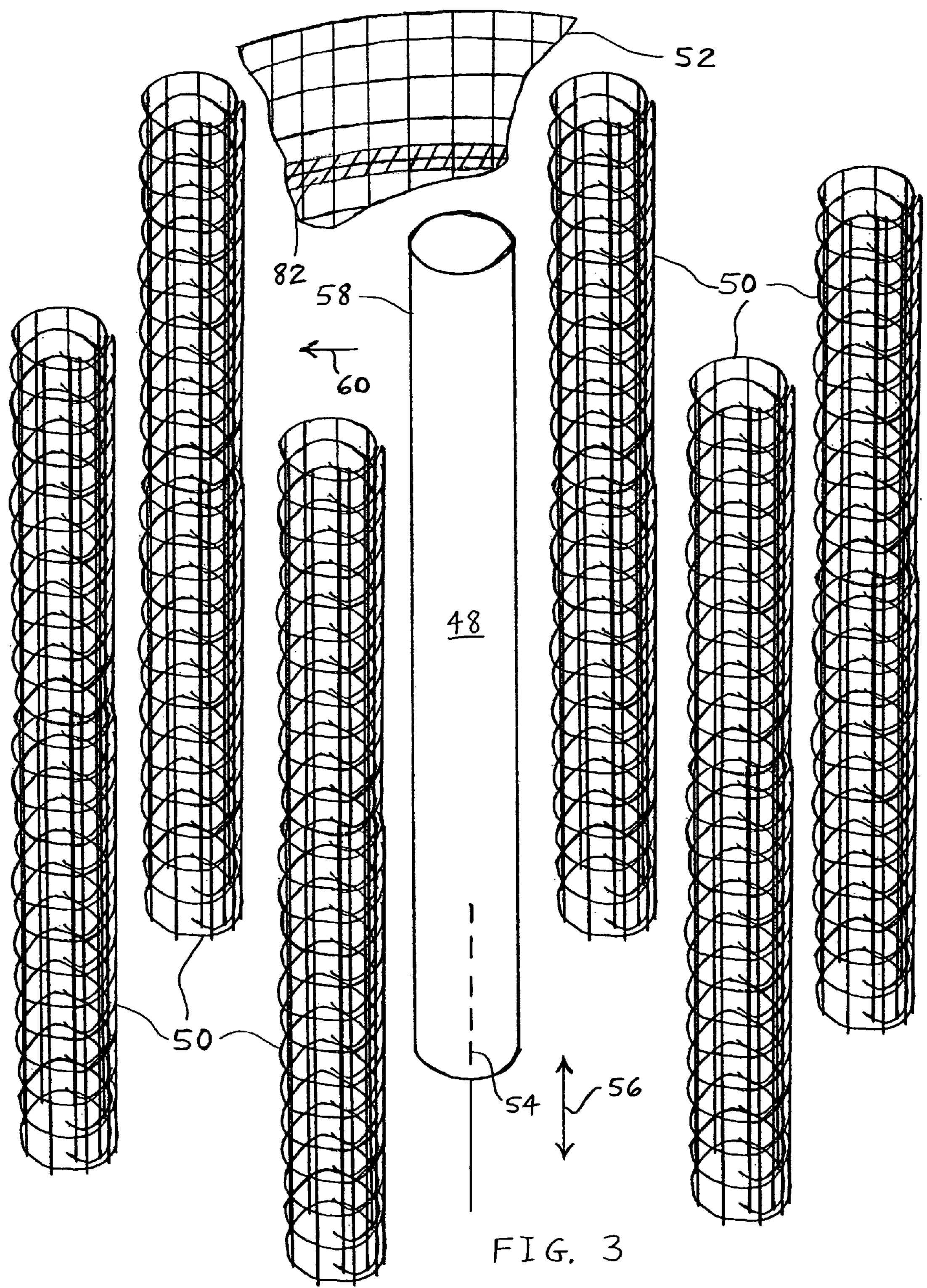
FIG. 3 is an exploded, partially fragmentary, perspective view of the coalescing medium assembly of FIG. 2.

One embodiment of coalescing medium assembly 30 of FIG. 1 is shown in FIG. 2. Assembly 30 includes an elongate core element in the form of a cylindrical tube 48. Tube 48 can be hollow and open ended to allow the coalescing of bubbles on both an interior annular surface and an exterior annular surface of tube 48. Tube 48 is surrounded by six wire mesh tubes 50 which are oriented substantially parallel to tube 48. That is, wire mesh tubes 50 form a "ring" around tube 48. A wire mesh retaining wall 52 substantially surrounds wire mesh tubes 50, thereby holding tubes 50 together in engagement with each other and with central tube 48. The individual components of assembly 30 may be best seen in the exploded view of FIG. 3. Only a fragment of retaining wall 52 is shown in FIG. 3 in order to maintain clarity in the drawing.

Central cylindrical tube 48 has a longitudinal axis 54 extending in a longitudinal direction indicated by double arrow 56. Tube 48 also has a substantially continuous annular side surface 58 facing in lateral or radial directions 60 away from axis 54 and substantially perpendicular to longitudinal direction 56. The continuousness of surface 58 provides increased surface area on which air bubbles can coalesce, thereby facilitating the removal of air from the flow of water 16. Surface 58 is substantially continuous in that it has few if any holes or perforations that would reduce its surface area available for the coalescing of bubbles. The continuousness of surface 58 also provides tube 48 and assembly 30 with structural strength to withstand the force of a high speed flow of water.

Figure 4:
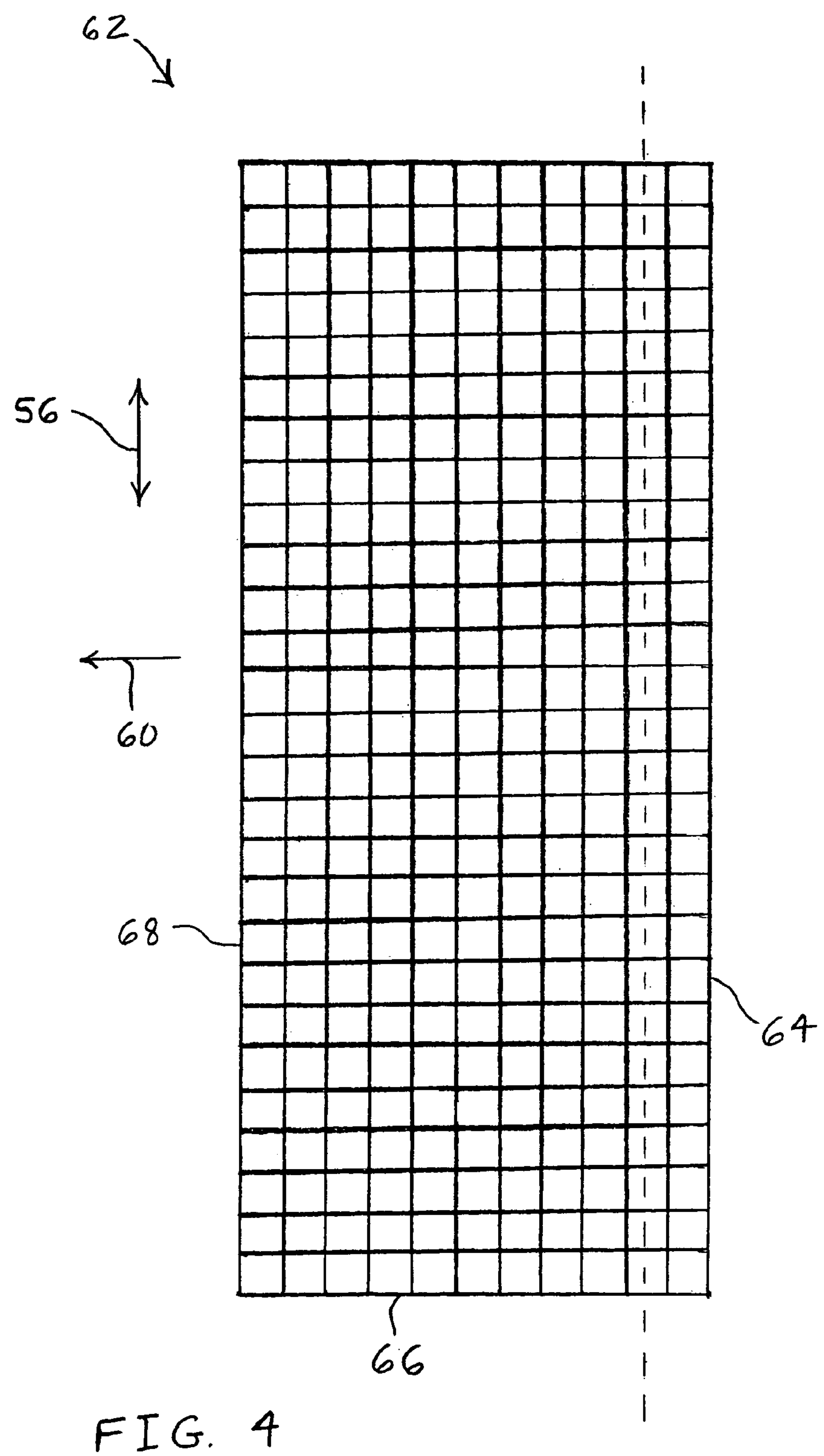
FIG. 4 is a plan view of a piece of wire mesh from which a wire mesh tube of the coalescing medium assembly of FIG. 2 can be formed.

The six wire mesh tubes 50 can be substantially identical. Each tube 50 can be rolled into a tubular shape from a planar, rectangular piece of wire mesh 62 (FIG. 4). Although tubes 50 are not continuous cylinders (as is tube 48), and do not convey a fluid in longitudinal directions 56, they are referred to herein as "tubes" by virtue of their tubular shape. Wire mesh 62 can have approximately four strands of wire per inch in both longitudinal directions 56 and lateral direction 60. The diameter of the wire can be approximately between 0.02 inch and 0.04 inch. In one embodiment, the wire has a diameter of 0.032 inch. Of course other sizes of mesh, including different wire densities and thicknesses, are also possible.

Figure 5:
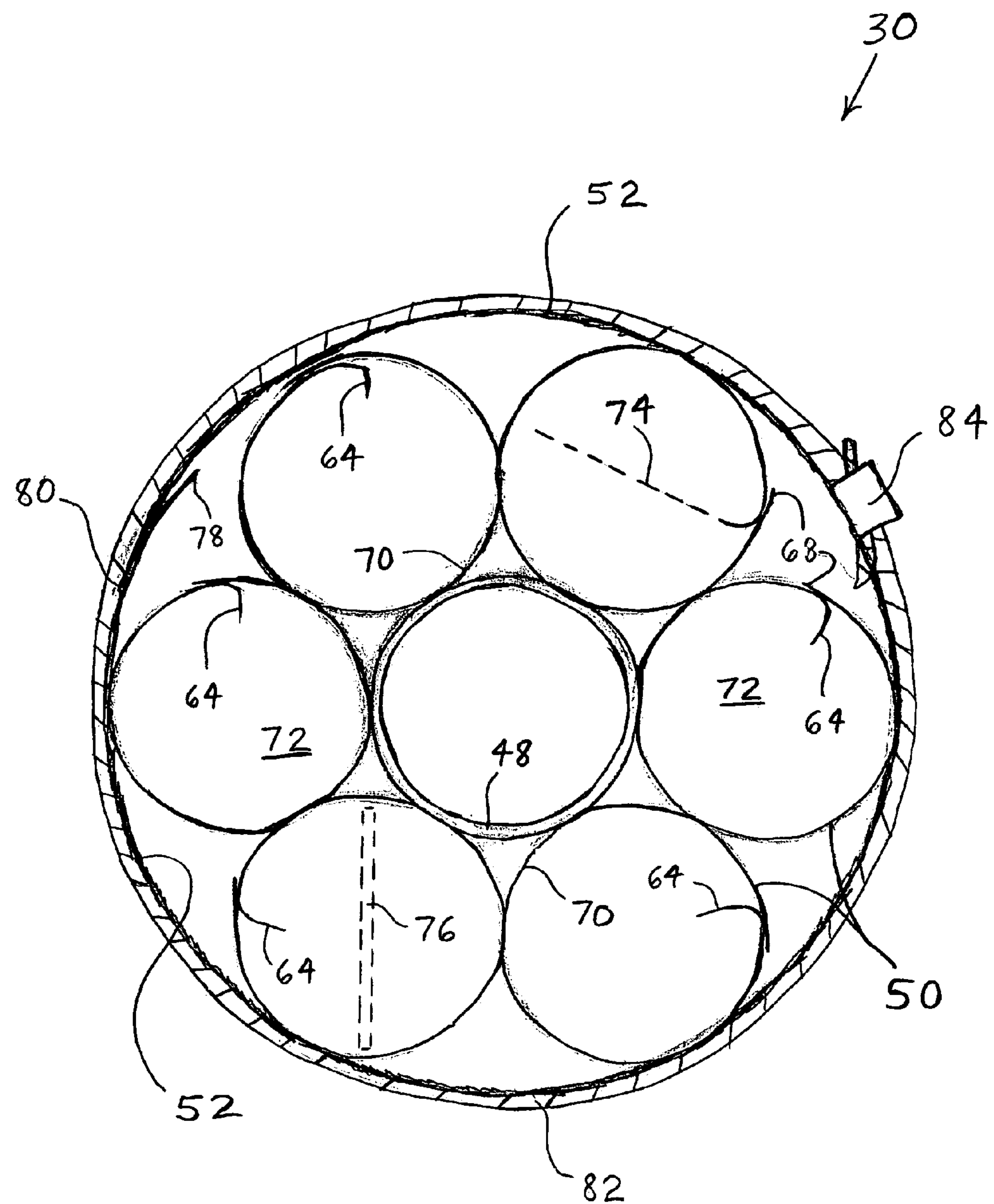
FIG. 5 is a top view of the coalescing medium assembly of FIG. 2.

During manufacture of a tube 50, a narrow, longitudinally oriented strip 64, defined as being a portion of wire mesh 62 that is disposed to the right-hand side of the dashed line in FIG. 4, can be gripped by a rolling machine (not shown). As the rolling machine rolls a remainder 66, defined as being a portion of wire mesh 62 that is disposed to the left-hand side of the dashed line in FIG. 4, a side edge 68 of mesh 62 can overlap strip 64 and can possibly overlap an additional portion of mesh 62 that is adjacent to strip 64, as best seen in FIG. 5. Thus, once tube 50 has been rolled from wire mesh 62, strip 64 takes the form of a projection extending from an inner surface 70 of tube 50 into an interior 72 of tube 50.

It is to be understood, however, that it is not necessary for side edge 68 to overlap any other part of mesh 62. That is, there can be a gap between side edge 68 and strip 64 such that the circumference of tube 50 does not form a closed loop.

Projection 64 has the advantage of providing additional surface area on tube 50 on which bubbles can coalesce. In an alternative embodiment, the strip gripped by the rolling machine can have an increased width such that a resulting projection 74 extends almost across the entire width or diameter of the wire mesh tube. Projection 74 provides still greater surface area for coalescing as compared to projection 64.

In another alternative embodiment, an elongate surface area-providing element in the form of a strip 76, possibly formed of stainless steel, is inserted into each wire mesh tube in order to provide additional surface area for facilitating the coalescing of bubbles. Strip 76 can extend the entire length of the wire mesh tube in longitudinal directions 56. In yet another alternative embodiment (not shown), strip 76 is bent in half at a 90° angle along a line of articulation extending in directions 56, i.e., strip 76 is bent in a direction that is in the plane of FIG. 5. A second similarly bent strip 76 can be inserted into the wire mesh tube such that the two bent strips 76 form a substantially X-shaped pattern, thereby further increasing the useful surface area for coalescing. Strip 76 can be formed of a continuous sheet or of a mesh material.

As best seen in FIG. 5, the six wire mesh tubes 50 and central tube 48 have substantially equal widths or diameters. For example, the outer diameters of tubes 48, 50 can be approximately between 0.4 inch and 0.8 inch. In particular embodiments, the outer diameters of tubes 48, 50 can be approximately 0.50 inch or 0.75 inch. The substantially equal diameters of tubes 48, 50 allows wire mesh tubes 50 and central tube 48 to be packed tightly together such that each tube 50 can engage both tube 48 and two adjacent ones of tubes 50. Thus, when inserted into a cavity having a round cross-sectional area and a corresponding interior diameter, such as cavity 24, tubes 48 and 50 can be substantially immovable, even without the benefit retaining wall 52, by virtue of the tight packing of tubes 48, 50. Since tubes 48, 50 are substantially immovable, tubes 48, 50 are less likely to be pushed away from inlet 20 and toward outlet 22 by the force of water flow 16, which can be approximately 3500 gallons per minute in some applications. By virtue of tubes 48, 50 being evenly distributed about cavity 24, it has been found that the coalescing of bubbles is facilitated. It has also been found that the even distribution of tubes 48, 50 within cavity 24 enables the flow rate to be increased with little or no reduction in the air and debris-removing capability of apparatus 10.

Wire mesh retaining wall 52 can be formed of the same wire mesh material of which wire mesh tubes 50 are formed. Retaining wall 52 can be formed from a planar, rectangular piece of the wire mesh (not shown). Retaining wall 52 can be wrapped around tubes 50 such that opposite side edges 78, 80 of retaining wall 52 overlap each other.

It is to be understood, however, that it is not necessary for side edges 78, 80 to overlap each other. That is, there can be a gap between edges 78 and 80 such that the circumference of retaining wall 52 does not form a closed loop.

One or more bands 82 can be wrapped around retaining wall 52 in order to hold or bias retaining wall 52 in engagement with tubes 50. A clasp 84 may be used to secure overlapping portions of a band 82 together such that band 82 is kept tight against retaining wall 52, and retaining wall 52, in turn, is kept tight against tubes 50.

If a cavity, such as cavity 24, is of an appropriate, corresponding width, it is possible to insert tubes 48, 50 into the cavity without retaining wall 52 and bands 82. In this case, an interior surface 86 of shell 18 can hold tubes 48, 50 substantially immovably in position.

Figure 6:
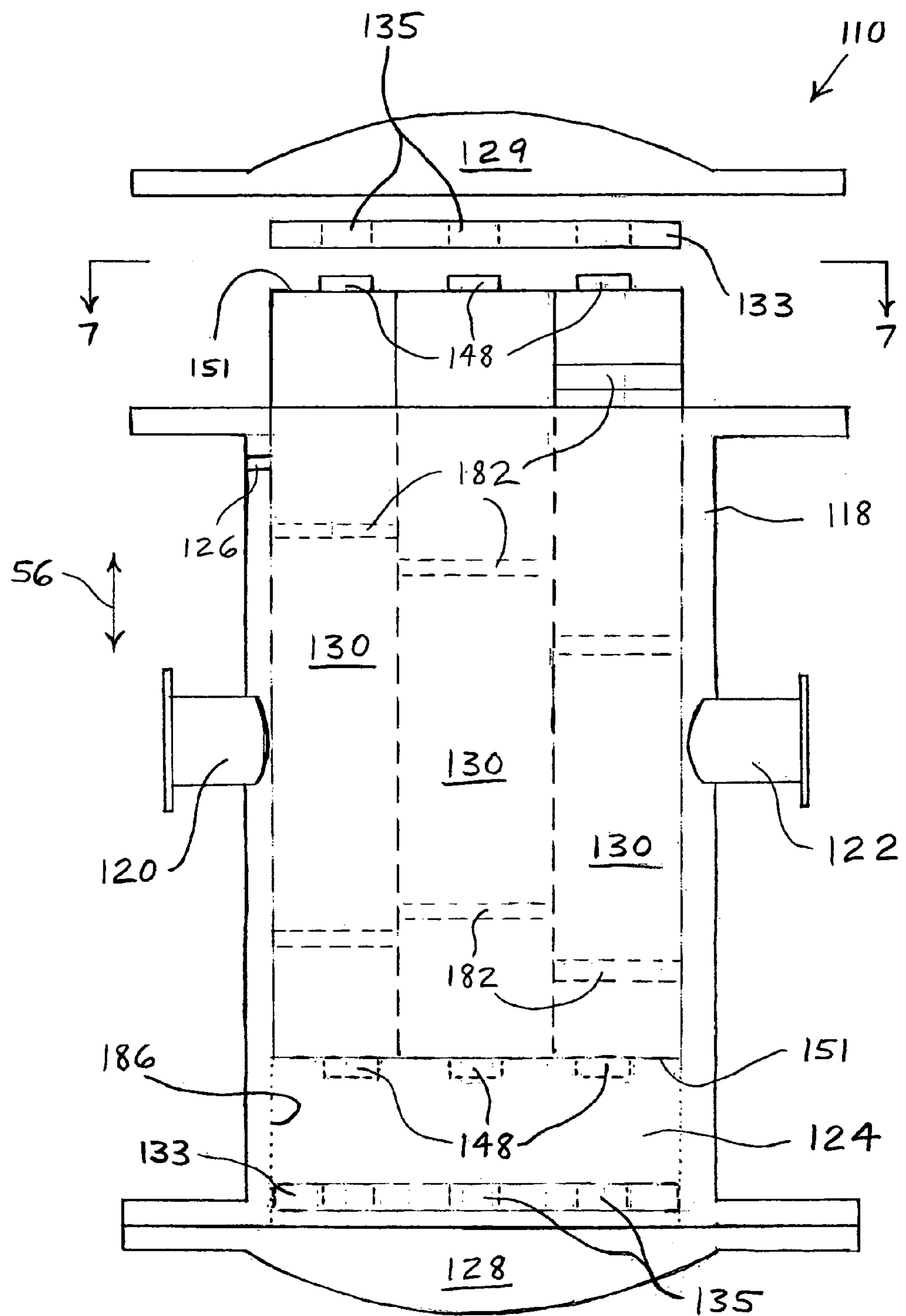
FIG. 6 is a schematic, partially exploded front view of another embodiment of an apparatus of the present invention for removing air or debris from a flow of liquid.

Another embodiment of the present invention is shown in FIG. 6 as apparatus 110. Similarly to apparatus 10, apparatus 110 removes entrained air and air microbubbles and/or particles of dirt or debris from a flow of liquid, such as a flow of water. Apparatus 110 includes a shell 118 having an inlet 120, an outlet 122, and an elongate inner cavity 124 in fluid communication with each of inlet 120 and outlet 122. Shell 118 also includes a removable bottom section 128 and/or a removable top section 129. One or both of bottom section 128 and top section 129 can be separated from the remainder of shell 118 in order to insert a plurality of coalescing medium assemblies 130 into cavity 124, or to remove assemblies 130 therefrom. Coalescing medium assemblies 130 are indicated only schematically in FIG. 6, as the structural details of assemblies 130 will be discussed in detail below. Shell 118 can also include a venting device and/or one or more valves for releasing gas, equalizing pressure and/or removing dirt particles, similarly to shell 18. However, such a venting device and valves are not shown in FIG. 6 in order to simplify the drawing. A venting port 126 for enabling the escape of air from cavity 124 and into the ambient environment is schematically indicated in FIG. 6.

Figure 7:
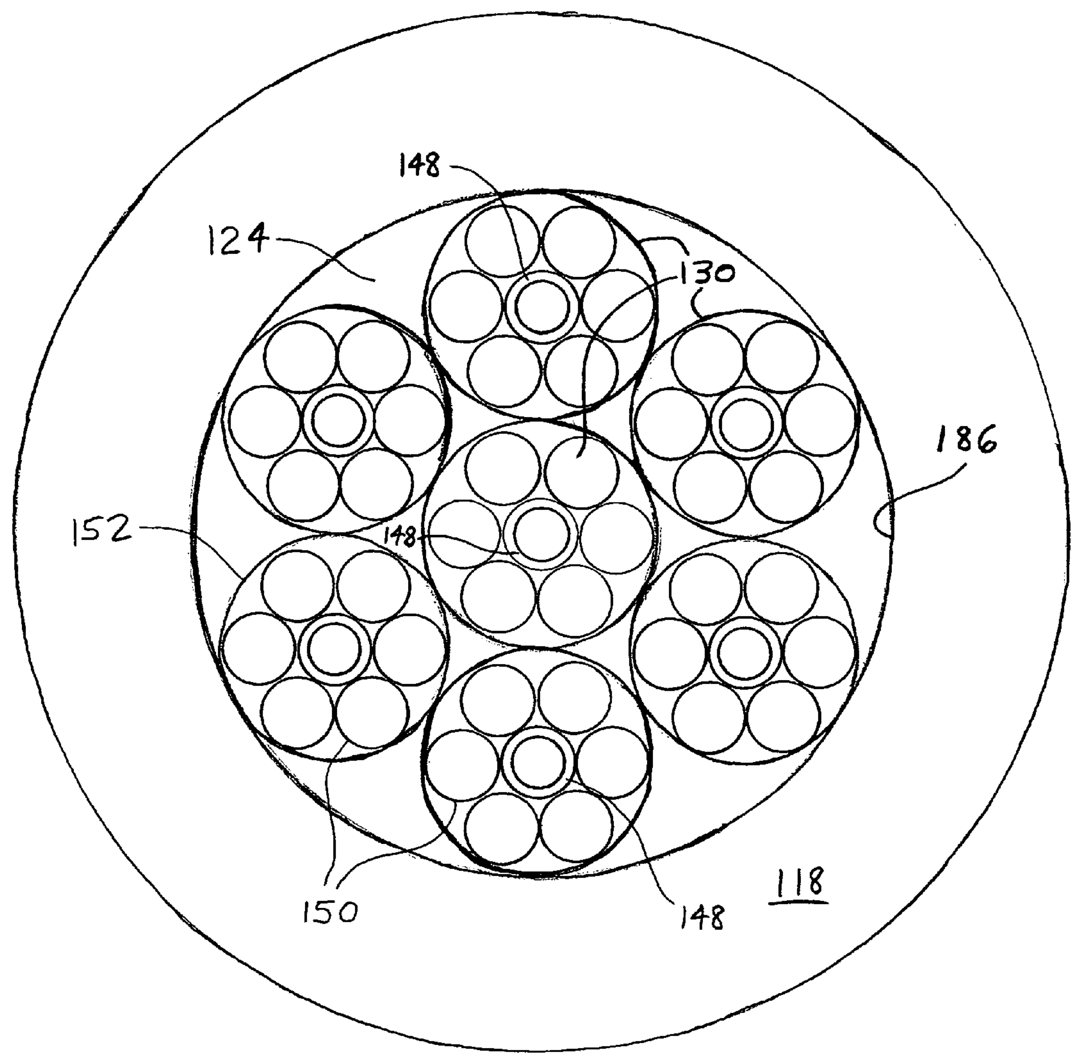
FIG. 7 is a top view of the apparatus of FIG. 6 along line 7-7.

The width of each individual assembly 130 can be approximately equal to the width of each individual assembly 30, e.g., approximately 2.25 inches. However, the width or diameter of cavity 124 can be several times greater than the width of cavity 24, and thus more than one assembly 130 can be inserted into cavity 124. For example, the width of cavity 124 can be approximately 7.75 inch such that seven coalescing medium assemblies 130 each of approximately 2.25 inch width can fit into cavity 124, as shown in FIG. 7. With the dimensional relationships between cavity 124 and assemblies 130 being as shown in FIG. 7, an interior surface 186 of shell 118 can hold assemblies 130 substantially immovably in position.

In an alternative embodiment (not shown), the width of the shell cavity is approximately 24 inches. Approximately 70 coalescing medium assemblies, each having a width of approximately between 2.25 inches and 2.50 inches, are inserted into the shell cavity, thereby substantially filling the shell cavity to fully capacity.

Each assembly 130 can include a central cylindrical tube 148 having a length in longitudinal direction 56 that is greater than the lengths of wire mesh tubes 150. Thus, the opposite ends of tubes 148 can extend past the opposite ends 151 of adjacent tubes 150, as best seen in FIG. 6. As another means of holding assemblies 130 immovably in position, at least one end cap 133 having a plurality of recesses in the form of throughholes 135 can be provided within cavity 124. Throughholes 135 are sized and positioned such that each throughhole 135 can receive an end of a corresponding one of central tubes 148. With central tubes 148 being received in one or both end caps 133, coalescing assemblies 130 can be retained in position as a group together with other coalescing assemblies 130. Thus, the use of one or both end caps 133 makes it easier to simultaneously insert a group of coalescing assemblies 130 into cavity 124.

Other aspects of coalescing medium assemblies 130 are substantially similar to those of coalescing medium assemblies 30, and thus are not discussed in detail herein. For example, each coalescing medium assembly 130 can include a wire mesh retaining wall 152 and one or more bands 182.

In operation, a water flow including air and/or dirt particles enters cavity 124 through inlet 120, is filtered by coalescing medium assemblies 130 to remove at least some of the air and/or dirt therefrom, and exits cavity 124 through outlet 122. In order to inhibit the water flow from bypassing coalescing medium assemblies 130 in its route from inlet 120 to outlet 122, inlet 120 and outlet 122 are disposed at locations along the longitudinal direction 56 that are between opposite ends 151 of coalescing medium assemblies 130.

Figure 8:
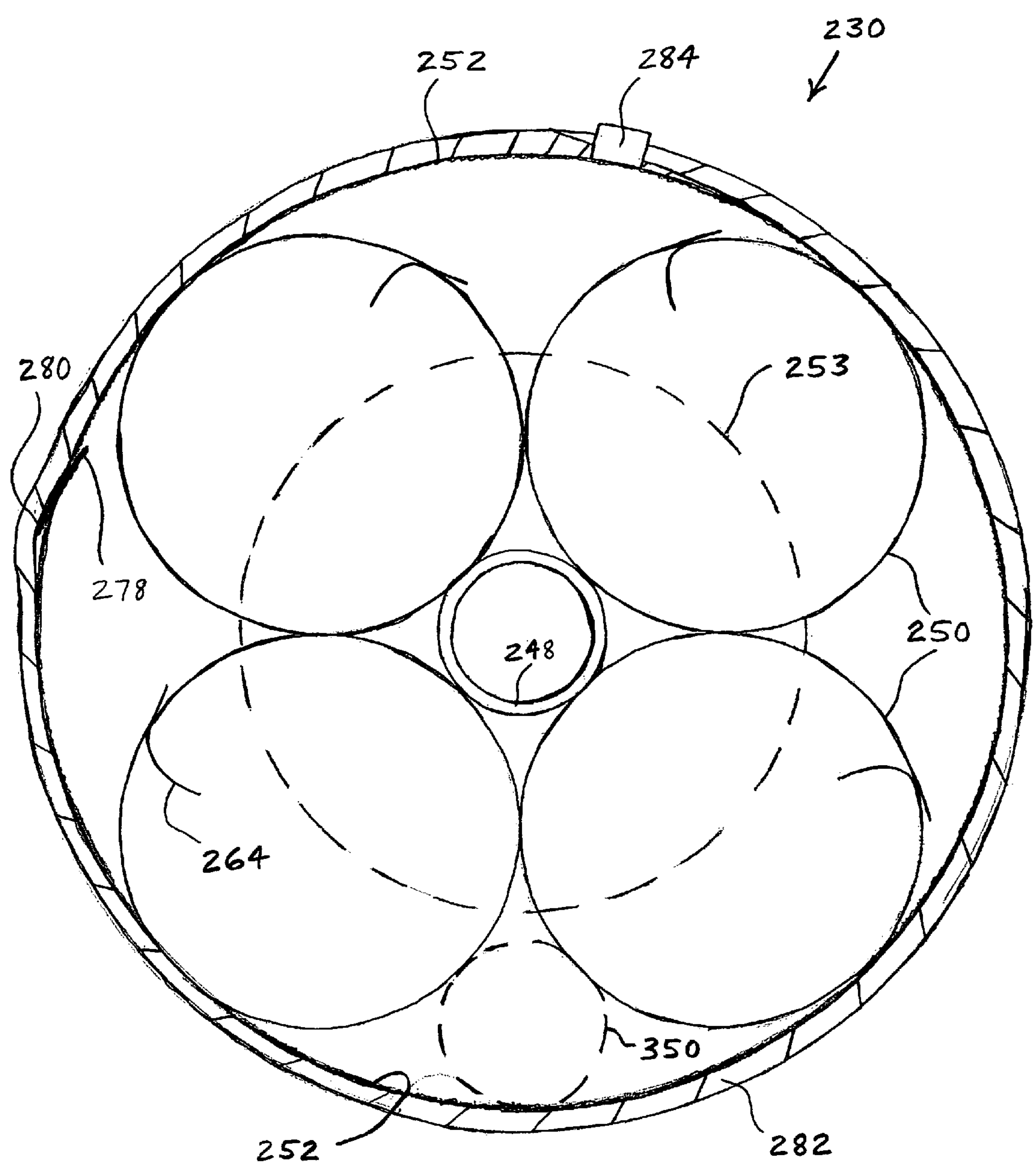
FIG. 8 is a top schematic view of another embodiment of a coalescing medium assembly of the present invention.

In another embodiment of a coalescing medium assembly 230 shown in FIG. 8, the diameters of four wire mesh tubes 250 are unequal to the diameter of a central cylindrical tube 248. However, as is the case with equal-diameter tubes 48, 50, there is a dimensional relationship between the diameters of tubes 248, 250 such that when tubes 250 are arranged in a circular arrangement, tube 248 can engage, i.e., touch, each of tubes 250 simultaneously. More particularly, tubes 250 are arranged such that the centers of tubes 250 define an imaginary circle 253 and each tube 250 engages two adjacent tubes 250. Central tube 248 is sized such that tube 248 can engage each of tubes 250 when disposed at the center of circle 253. Thus, despite tubes 248, 250 being of different diameters, it is possible to tightly pack tubes 248, 250 into a shell cavity, or to tightly wrap tubes 248, 250 with a retaining wall 252, such that tubes 248, 250 are substantially immovable during operation.

Other aspects of coalescing medium assembly 230 are substantially similar to those of coalescing medium assembly 30, and thus are not discussed in detail herein. For example, coalescing medium assembly 230 can include one or more bands 282 each secured by a respective clasp 284.

It is also possible for a coalescing medium assembly to include wire mesh tubes of different sizes. For example, in the embodiment of FIG. 8, additional wire mesh tubes, such as a schematically-indicated wire mesh tube 350, can be inserted into gaps between tubes 250 and 252. As is clear in FIG. 8, the diameter of tube 350 is less than the diameters of tubes 250. Additional tubes 350 may provide enhanced structural support as well as increased surface area for the coalescing of air bubbles and the filtering of dirt particles.

It is to be understood that each component of the various embodiments discussed above can be formed of stainless steel for its structural strength, low cost and durability. Components exposed to the flow of water that is being filtered, such as central tubes, wire mesh tubes, wire mesh retaining walls and bands, can particularly benefit from being formed of stainless steel. However, it is also possible for any of the components to be formed of a material other than stainless steel, such as copper for example.

It is also to be understood that the present invention is not limited to any particular number or arrangement of wire mesh tubes, tubes having continuous side surfaces and/or retaining walls. Nor is the present invention limited to any positional relationship between such various tubes and/or retaining walls. A few exemplary arrangements or positional relationships have been disclosed herein, but there are many other ways that the various tubes and retaining walls can be arranged within the scope of the invention.

The tube having a substantially continuous side surface has been described, shown, and referred to herein as being a "central" tube. However, it is also possible within the scope of the invention for a tube having a substantially continuous side surface to not be centrally located among the wire mesh tubes. For example, a coalescing medium assembly can include two tubes having substantially continuous side surfaces, with both tubes being disposed within a cluster of wire mesh tubes, but with neither tube being centrally positioned within the cluster.

The coalescing medium assemblies of the present invention have been shown herein as including a single "ring" of wire mesh tubes surrounding and engaging a central tube that has a substantially continuous side surface. However, it is also possible for a coalescing medium assembly to include a second "ring" of wire mesh tubes surrounding and engaging the first ring of wire mesh tubes.

While this invention has been described as having an exemplary design, the present invention may be further modified within the spirit and scope of this disclosure. This application is therefore intended to cover any variations, uses, or adaptations of the invention using its general principles.

What is claimed is:

1. An apparatus for removing air or debris from a flow of liquid, the apparatus comprising:

a shell having an inlet, an outlet, and an inner cavity in fluid communication with each of the inlet and the outlet; and at least one elongate coalescing medium assembly disposed within the cavity of the shell, each coalescing medium assembly including a plurality of wire mesh tubes oriented substantially parallel to each other, each wire mesh tube having ends, a longitudinal axis extending between the ends, and a side wall extending between the ends, and the flow of liquid being directed to travel in a radial direction across the plurality of wire mesh tubes to radially enter and radially exit the side walls of the plurality of wire mesh tubes; the at least one assembly further including at least one elongate core element contacting the plurality of wire mesh tubes and oriented substantially parallel to the plurality of wire mesh tubes, the elongated core element having a rigidity greater than the wire mesh tubes to support the plurality of wire mesh tubes against the flow of liquid in the radial direction across the plurality of wire mesh tubes.

2. The apparatus of claim 1, further comprising an end cap including a plurality of recesses, an end of each of the core elements being received in a respective one of the recesses.

3. The apparatus of claim 1, wherein the ends of each wire mesh tube are positioned at first and second longitudinal positions along the longitudinal axis, and the outlet has a longitudinal position between the first and second longitudinal positions of the ends.

4. The apparatus of claim 1, wherein each coalescing medium assembly further includes a coupling element surrounding the plurality of wire mesh tubes and holding the plurality of wire mesh tubes together.

5. The apparatus of claim 4, wherein each coalescing medium assembly includes a band wrapped around the coupling element and holding the coupling element in engagement with the plurality of wire mesh tubes.

6. The apparatus of claim 1, wherein at least one of the wire mesh tubes includes a wire mesh projection extending from an inner surface of the wire mesh tube and into an interior of the wire mesh tube.

7. The apparatus of claim 1, wherein the outlet is substantially devoid of flow restrictions.

8. The apparatus of claim 1, wherein the inlet has a minimum cross-sectional area of flow and the outlet has a minimum cross-sectional area of flow that is substantially equal to the minimum cross-sectional area of flow of the inlet.

9. The apparatus of claim 1, wherein the inner cavity of the shell has an interior diameter and the plurality of wire mesh tubes have diameters and the diameter of each of the plurality of wire mesh tubes is substantially less than the interior diameter of the inner cavity.

10. The apparatus of claim 1, wherein the flow of fluid enters the wire mesh tubes by passing through wire mesh of the tubes.

11. The apparatus of claim 1, wherein the velocity of the flow of fluid is substantially greater in the inlet than in the cavity of the shell.

12. The apparatus of claim 1, wherein the at least one elongate coalescing medium assembly includes a plurality of elongate coalescing medium assemblies and at least one of the elongate coalescing medium assembly is centered between the other elongate coalescing medium assemblies.

13. An apparatus for removing air or debris from a flow of liquid, the apparatus comprising:

a shell having an inlet, an outlet, and an inner cavity in fluid communication with each of the inlet and the outlet, the inner cavity having a direct flow path space positioned directly between the inlet and outlet, and a plurality of tubes positioned within the inner cavity of the shell such that the tubes are oriented substantially parallel to each other and upper ends of the tubes being positioned above the inlet, each of the tubes having a longitudinal axis, and at least one of the tubes having a surface with a plurality of apertures, a minority portion of the plurality of tubes being positioned in the direct flow path space with the flow of fluid between the inlet and outlet flowing directly across the minority portion of the plurality of tubes in a substantially radial direction, a majority portion of the plurality of tubes being larger than the minority portion of the plurality of tubes and positioned outside of the direct flow path space; and an air vent positioned to release air that is removed from the flow of liquid by the plurality of tubes.

14. The apparatus of claim 13, wherein the flow of liquid flows into and out of the tubes in a direction substantially transverse to the longitudinal axes of the tubes.

15. The apparatus of claim 13, wherein the air vent is positioned above the plurality of tubes.

16. The apparatus of claim 13, wherein the shell further comprises a bottom section including an aperture that is substantially smaller than the inlet and configured to permit removal of debris that settles out of the flow of liquid.

17. The apparatus of claim 13, wherein the shell further comprises a bottom section that is removably attached to the remainder of the shell.

18. The apparatus of claim 13, wherein the shell further comprises a bottom section including a valve configured to permit selective removal of debris that settles out of the flow of liquid.

19. The apparatus of claim 13, wherein the outlet is substantially devoid of flow restrictions.

20. The apparatus of claim 13, wherein the inlet has a minimum cross-sectional area of flow and the outlet has a minimum cross-sectional area of flow that is substantially equal to the minimum cross-sectional area of flow of the inlet.

21. The apparatus of claim 13, wherein a first segment of the majority portion of the plurality of tubes is positioned below the direct flow path space and the first segment is larger than the minority portion of the plurality of tubes.

22. The apparatus of claim 21, wherein a second segment of the majority portion of the plurality of tubes is positioned above the direct flow path space across the direct flow path space from the first segment and the second segment is larger than the minority portion of the plurality of tubes.

23. An apparatus for removing air or debris from a flow of liquid, the apparatus comprising:

a shell having an inlet, an outlet, and an inner cavity in fluid communication with the inlet and the outlet; and at least one elongate coalescing medium assembly disposed within the inner cavity of the shell, each coalescing medium assembly including:

at least one elongate core element; and a plurality of wire mesh tubes, each of the wire mesh tubes having a longitudinal axis, the wire mesh tubes cooperating to define at least one interior space therebetween, and the at least one elongate core element having a rigidity greater than the plurality of wire mesh tubes and being positioned within the interior space in an orientation substantially parallel to the plurality of wire mesh tubes to support the plurality of wire mesh tubes against the flow of liquid through the apparatus.

24. The apparatus of claim 23, further comprising an end cap including at least one recess, an end of each of the elongate core elements being received in a respective one of the recesses.

25. The apparatus of claim 23, wherein the elongate core element comprises a cylindrical tube.

26. The apparatus of claim 23, wherein the wire mesh tubes are arranged in a substantially circular pattern when viewed along the longitudinal axes of the wire mesh tubes such that each wire mesh tube engages two adjacent ones of the wire mesh tubes.

27. The apparatus of claim 23, wherein the plurality of wire mesh tubes are formed of substantially horizontal wires and interconnected substantially vertical wires.

28. The apparatus of claim 13, wherein the inner cavity of the shell has an interior diameter and the plurality of wire mesh tubes have diameters and the diameter of each of the plurality of wire mesh tubes is substantially less than the interior diameter of the inner cavity.

29. The apparatus of claim 13, wherein the flow of fluid enters the wire mesh tubes by passing through wire mesh of the tubes.

30. An apparatus for removing air or debris from a flow of liquid, the apparatus comprising:

a shell having an inlet, an outlet, and an inner cavity in fluid communication with each of the inlet and the outlet; and at least one elongate coalescing medium assembly disposed within the inner cavity of the shell, each coalescing medium assembly including a plurality of wire mesh tubes oriented substantially parallel to each other, each wire mesh tube having ends and a longitudinal axis extending between the ends, and the flow of liquid flowing in a direction substantially transverse to the longitudinal axis of the plurality of wire mesh tubes, each coalescing medium assembly further comprising a wire mesh retaining wall surrounding the plurality of tubes.

31. The apparatus of claim 30, wherein the ends of each wire mesh tube are positioned at first and second longitudinal positions along the longitudinal axis, and the outlet has a longitudinal position between the first and second longitudinal positions of the ends.

32. The apparatus of claim 30, further comprising an air vent positioned above the plurality of wire mesh tubes to release air that is removed from the flow of liquid by the plurality of wire mesh tubes.

33. The apparatus of claim 30, wherein the shell further comprises a bottom section that is removably attached to the remainder of the shell.

34. The apparatus of claim 30, wherein the shell further comprises a bottom section including a valve configured to selectively remove debris that settles out of the flow of liquid.

35. The apparatus of claim 30, wherein the at least one coalescing medium assembly further comprises at least one elongate core element oriented substantially parallel to the plurality of wire mesh tubes to support the plurality of wire mesh tubes against the flow of liquid through the apparatus.

36. The apparatus of claim 30, wherein each wire mesh tube includes a sidewall extending between the ends and the liquid enters and exits the sidewalls while passing through the wire mesh tubes.

37. The apparatus of claim 30, wherein the outlet is substantially devoid of flow restrictions.

38. The apparatus of claim 30, wherein the inlet has a minimum cross-sectional area of flow and the outlet has a minimum cross-sectional area of flow that is substantially equal to the minimum cross-sectional area of flow of the inlet.

39. The apparatus of claim 30, wherein the inner cavity of the shell has an interior diameter and the plurality of wire mesh tubes have diameters and the diameter of each of the plurality of wire mesh tubes is substantially less than the interior diameter of the inner cavity.

40. The apparatus of claim 30, wherein the flow of fluid enters the wire mesh tubes by passing through wire mesh of the tubes.

41. The apparatus of claim 30, wherein the velocity of the flow of fluid is substantially greater in the inlet than in the cavity of the shell.

42. The apparatus of claim 30, wherein the plurality of wire mesh tubes include a plurality of openings of about 0.25 inches.

* * * * *